Patented Apr. 25, 1944

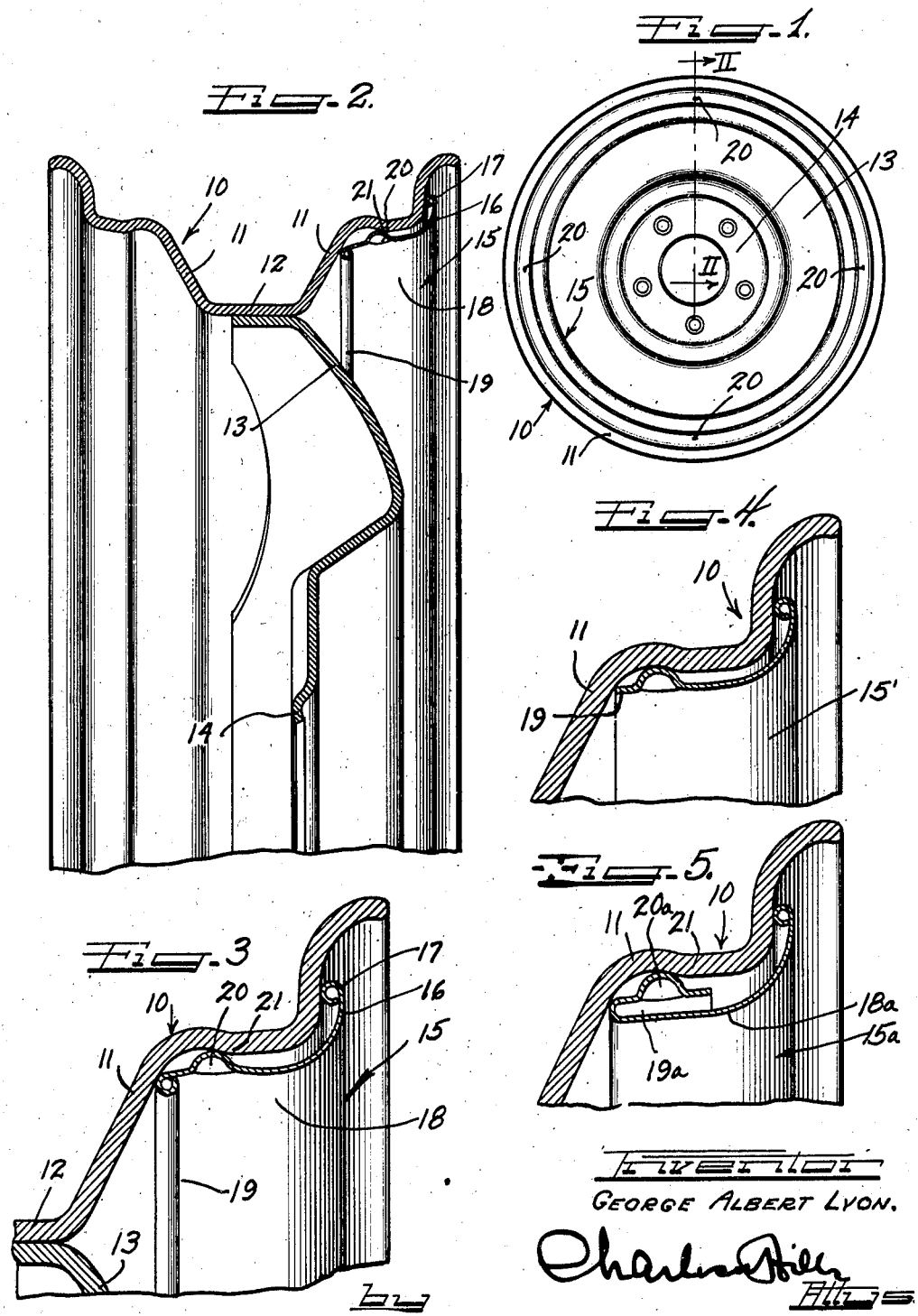

2,347,206

UNITED STATES PATENT OFFICE 2,347,206

ORNAMENTAL WHEEL TRIM RING

George Albert Lyon, Allenhurst, N. J.

Application November 25, 1940, Serial No. 366,973

2 Claims. (Cl. 41—10)

This invention relates to an ornamental trim ring for a wheel, and more particularly a novel construction for detachably securing a trim ring on the tire rim of a wheel.

An object of this invention is to provide an improved and simplified ornamental trim ring for a wheel.

Another object of this invention is to provide improved and simplified construction for detachably securing a trim ring on the tire rim of a wheel.

In accordance with the general features of this invention, there is provided in a wheel structure an ornamental member for snap-on retaining co-operation with the wheel rim, and which comprises a metallic annulus having an outwardly turned marginal portion and an inner body portion disposed at a substantial angle to the marginal portion and provided with a plurality of outwardly and radially extending spaced bumps formed resilient so as to have a snap-on detachable engagement with a shoulder on the wheel rim; this shoulder also serving as an abutment for preventing displacement of the tire bead.

Another feature of the invention relates to the provision of resilient indentations in an axially extending portion of the trim ring which are deflectable inwardly when the trim ring is pressed home into retaining cooperation with the tire rim of a wheel.

Other objects and features of this invention will more fully appear from the following detailed description taken in connection with the accompanying drawing which illustrates several embodiments thereof, and in which:

Figure 1 is a side view of a wheel construction embodying the features of this invention;

Figure 2 is an enlarged fragmentary cross sectional view taken on the line II—II of Figure 1 looking in the direction indicated by the arrows;

Figure 3 is an enlarged fragmentary cross sectional view corresponding to a portion of Figure 2 and showing more clearly the manner in which the retaining bumps of my novel trim ring co-operate with a shoulder of the tire rim;

Figure 4 is a view similar to Figure 3 but showing a modification of the trim ring; and Figure 5 is a view similar to Figure 3 but showing still another modification of the invention wherein the bumps are provided on a resilient turned back flange of the trim ring.

As shown on the drawing:

The reference character 10 designates generally a drop center type of tire rim including the usual stepped side flanges 11 and a base flange 12, to which the body part or spider 13 of a wheel is suitably attached. This body part 13 may be of any suitable construction and has the usual central bolt fastening flange 14.

Cooperable with the outer side of the tire rim 10 is an annular or endless trim ring 15 embodying the features of this invention. This trim ring may be made of any suitable material, such, for example, as strip steel. I have obtained excellent results by making trim rings of stainless steel and of 18-8 steel of .020" thickness.

This trim ring 15, which is adapted for detachable snap-on retaining engagement with the tire rim, includes an outwardly radially extending marginal portion 16 which terminates in a beaded edge 17 adated to be disposed close to or contiguous with the side flange 11 of the tire rim. The marginal portion 16 extends radially inwardly into a generally axially extending body portion 18, which has its rear margin turned radially inwardly and formed into a reinforced beaded edge 19.

Positioned substantially midway between the two reinforced edges 17 and 19 are a plurality of radial bumps 20 which are formed by pressing indentations in the body portion 18 of the ring. These bumps are necessarily resilient due to the thinness of the material, as well as the character of the same, and are adapted to be sprung over a shoulder abutment 21 formed on one of the flanges 11 of the tire rim 10. In this flexing action, the bumps 20 are deflected or pressed radially inwardly as they are passed over the shoulder 21 when the trim ring is pressed home into retaining cooperation with the wheel rim. It will, of course, be appreciated that the bumps are disposed in a circle having a diameter which at the outer extremity of the bumps is slightly greater than the inner diameter of the annular shoulder 21. Hence, when these bumps are pressed over and behind the shoulder 21, they of necessity must give way and, upon passing the high spot of the shoulder, partly spring back outwardly so as to tightly hug the inner and inclined surface of the shoulder.

The inner beaded edge 19 of the ring 15 may or may not, as desired, contact a side flange of the tire rim, as is shown in Figure 3. In Figure 4, a slight modification of the ring is illustrated, which differs from the above described form in that instead of the inner edge of the ring 15' being turned it is formed substantially straight as shown at 19' and is adapted to abut or seat against a side flange of the tire rim 10.

In Figure 5, I have illustrated still a further modification of the invention wherein the trim ring 15a is provided with a turned back portion 19a, which in reality is folded outwardly and then over the outermost surface of the body portion 18a of the ring. This turned back or folded portion 19a is provided with a plurality of spaced indentations or bumps 20a cooperable with the shoulder 21 in the same manner as the bumps 20 cooperate with the shoulder 21 in the previously described forms. In this form, as distinguished from the others, the bumps are mounted on a resilient flange which in itself can also flex over and on top of the main body of the trim ring 15a.

It will be perceived that in all forms the portion of the ring at the protuberances or bumps flexes as the ring is pressed home or, in other words, as the bumps are pressed inwardly over rim shoulder 21. During this flexing of the ring, the bumps are distorted out of their normal surface and upon passing the high point of the shoulder 21 turn, due to the resiliency of the ring, part way back to their original position. Thus, when the bumps are in retaining position, they are under tension by reason of their tendency to want to return to their original position or normal circle. It is this spring pressure exerted through the bumps that aids in cooperating with the shoulder 21 in holding the ring on the wheel.

It will also be observed that in all forms of my invention I utilize the rim shoulder in the retaining of the wheel cover on the wheel. This shoulder is one of two provided in the rim flanges to prevent slipping or sliding of the tire beads toward the base flange of the rim. Without such shoulders there is a marked tendency of the beads sliding transversely toward the rim base flange when the tire is punctured and thereby occasioning damage to or excessive wear of the tire. Thus these shoulders are employed for a dual function in my novel wheel construction.

I claim as my invention:

1. In a wheel structure including a wheel and a multi-flange drop center type rim having a shoulder formed by an annular tire bead receiving depression in an inner surface of a flange of said rim which depression provides on the outer side of the same flange an annular shoulder, an ornamental member for snap-on retaining cooperation with the wheel rim comprising an annulus having a generally radially extending outer edge portion and a generally axially extending continuous annular body portion, said body portion being indented at a plurality of spaced points and the indentations being formed into a plurality of outwardly and radially extending spaced bumps formed resilient so as to be sprung over and into member retaining engagement with said shoulder of the wheel rim, said annulus having reinforced inner and outer edges with said bump disposed transversely midway between said edges, said reinforced inner edge of said annulus being positioned to abut a radial flange of said rim.

2. In a wheel structure including a wheel and a multi-flange drop center type rim having a shoulder formed by an annular tire bead receiving depression in an inner surface of a flange of said rim which depression provides on the outer side of the same flange an annular shoulder, an ornamental member for snap-on retaining cooperation with the wheel rim comprising an annulus having a generally radially extending outer edge portion and a generally axially extending continuous annular body portion, said body portion being indented at a plurality of spaced points and the indentations being formed into a plurality of outwardly and radially extending spaced bumps formed resilient so as to be sprung over and into member retaining engagement with said shoulder of the wheel rim, said annulus having at least one of its two edges reenforced and with said bumps positioned transversely between said edges and said annulus also having a rear portion thereof formed and arranged to abut a radial flange of said rim when the member is pressed home into retained engagement with the rim.

GEORGE ALBERT LYON.